March 19, 1946.  A. B. ASCH  2,396,769
FILTER BED LEVELING OR SCRAPING MEANS
Filed Feb. 14, 1942  3 Sheets-Sheet 1
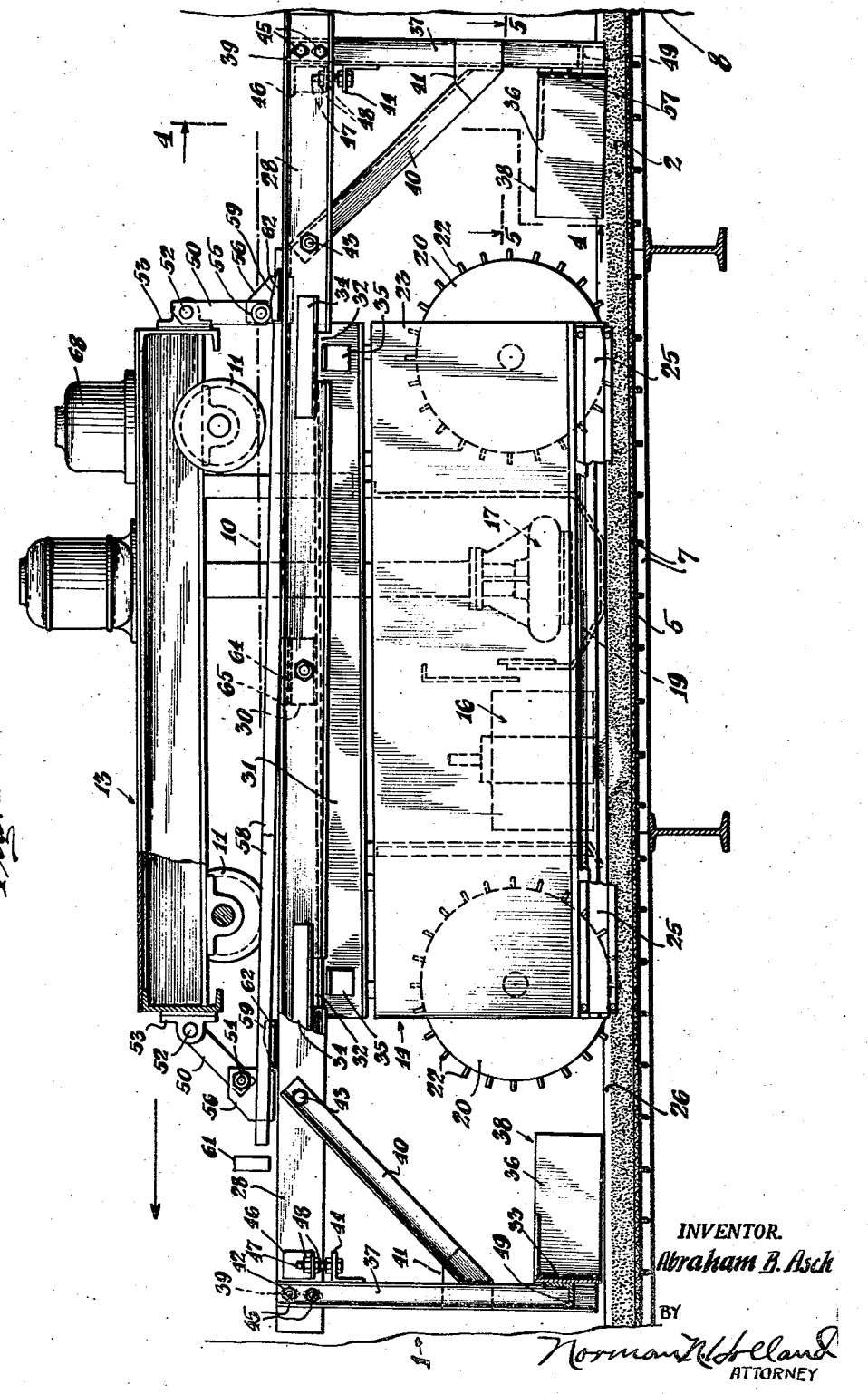
INVENTOR.
Abraham B. Asch
BY
Norman N. Holland
ATTORNEY March 19, 1946. A. B. ASCH 2,396,769
FILTER BED LEVELING OR SCRAPING MEANS
Filed Feb. 14, 1942 3 Sheets-Sheet 2
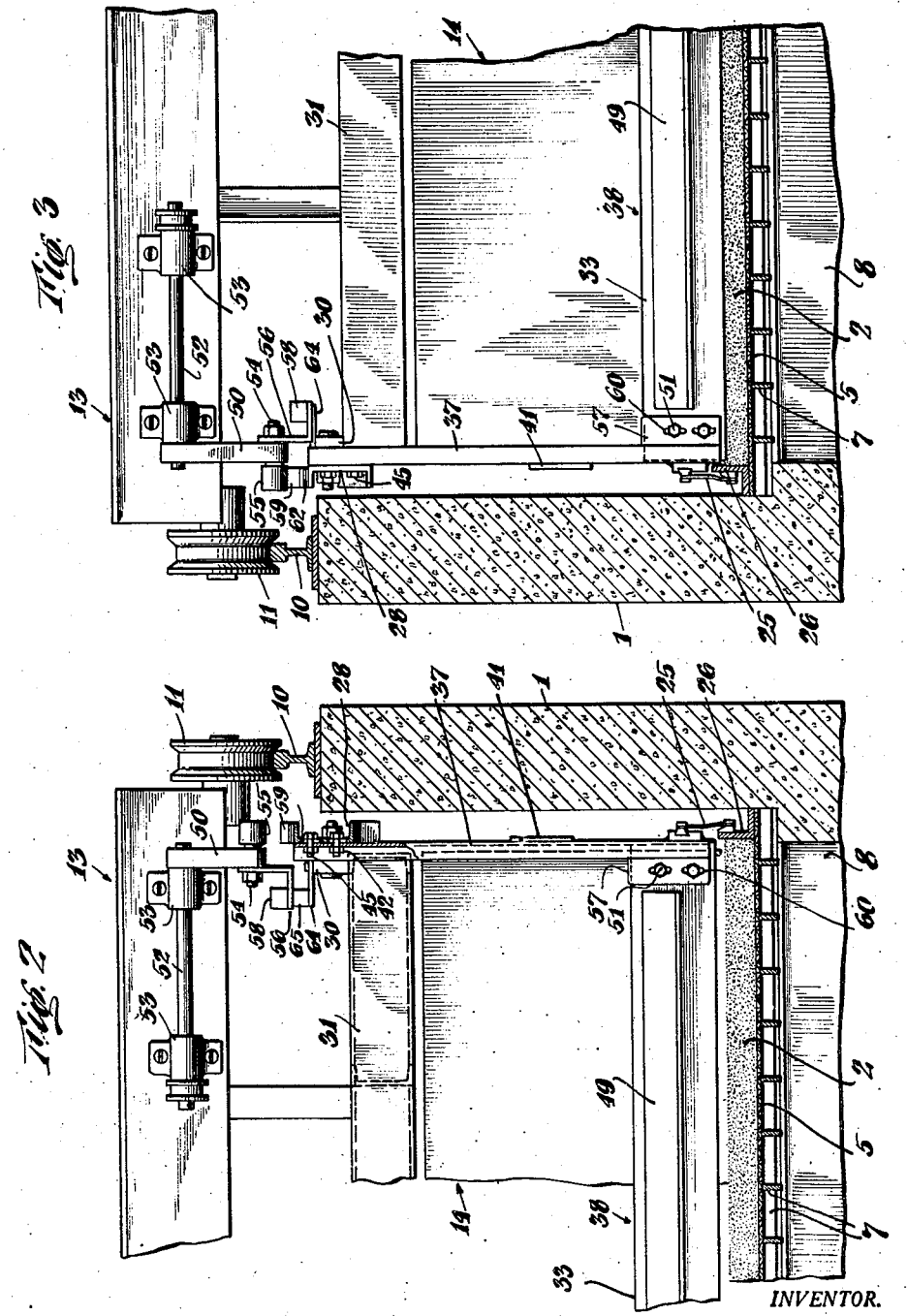
INVENTOR.
Abraham B. Asch
BY
Norman T. Holland
ATTORNEY March 19, 1946. A. B. ASCH 2,396,769
FILTER BED LEVELING OR SCRAPING MEANS
Filed Feb. 14, 1942  3 Sheets-Sheet 3
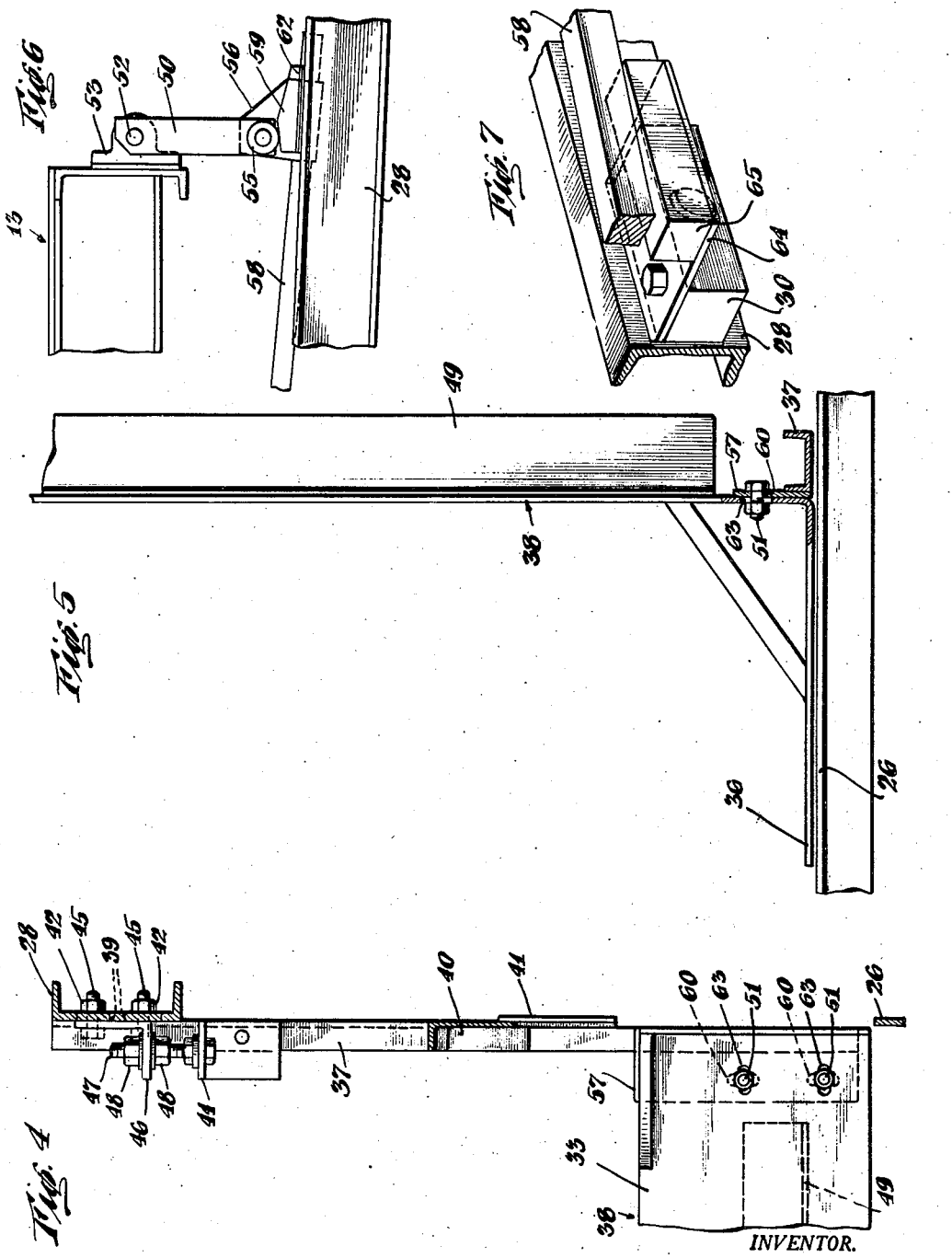
INVENTOR.
Abraham B. Asch
BY
Norman H. Holland
ATTORNEY Patented Mar. 19, 1946

2,396,769

UNITED STATES PATENT OFFICE 2,396,769

FILTER BED LEVELING OR SCRAPING MEANS

Abraham B. Asch, Jersey City, N. J., assignor to Charles E. Fraser, New York, N. Y.

Application February 14, 1942, Serial No. 430,898

13 Claims. (Cl. 210—128)

The present invention relates to means adapted to be used for smoothing or leveling a filter bed after it has been subjected to a cleaning operation.

In connection with the treatment of drinking water, sewage, industrial process liquids and other manufacturing operations, it is frequently desirable to pass liquids through a bed of sand or some other suitable material to filter or strain out suspended solid matter. After a filter bed has been in use for a period of time the sand or other material comprising the bed becomes choked with matter removed from the influent. This choking up of the filter bed lowers its efficiency by decreasing the rate at which liquid may pass through the bed. When this condition occurred it was formerly the practice to shut off the influent and backwash it or strip off the upper layer of the filter bed material and replace it with clean filter bed material. This was costly and inefficient for it involved shutting down a filter bed completely while the filter was being cleaned and made ready for further use.

To overcome the above disadvantages mechanical means have been devised for cleaning a filter bed while the bed remains in operation. These mechanical means, in general, agitate progressively portions of the filter bed material to loosen accumulated particles of dirt, sludge, and the like from the filter bed material and cause the loosened impurities to pass into a collecting tank from which they may be removed by a pump.

One difficulty experienced with such mechanical cleaning means is that frequently the agitated and cleaned filter bed material is washed about considerably by currents of cleansing liquid and is not reformed into a layer of substantially uniform thickness after passage of the cleaner over the bed. For maximum efficiency the thickness of the filter bed should be uniform so that each area of the bed filters substantially the same quantity of influent. If a filter bed contains both thick and thin areas of filtering material, the influent will pass relatively rapidly through the thin areas without having a maximum amount of dirt or other impurities strained out of it. Also, the thin or minimum thickness areas of such a filter bed, with an uneven thickness make sealing of the clearing chamber of a cleaning mechanism difficult and the maximum thickness layers present obstructions to passage of the cleaning mechanism over the bed. It is important, therefore, that after the filter bed material has been cleaned it be replaced in a layer of substantially uniform thickness.

The present invention aims to overcome the above and other difficulties by providing a new and improved filter bed smoothing or leveling means adapted to be utilized with mechanical filter bed cleaning devices.

An object of the present invention is to provide a new and improved filter bed leveling means.

Another object of the invention is to provide a filter bed leveling means which is automatic in operation.

Another object of the invention is to provide a filter bed leveling means having the operating mechanism therefor exposed to view and readily accessible at all times.

Another object of the invention is to provide a filter bed leveling means which is relatively simple in construction and operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a side view, partly broken away, illustrating a preferred embodiment of the invention;

Fig. 2 is a fragmentary end view, partly in section, showing a scraper in raised position;

Fig. 3 is a fragmentary end view, partly in section, showing a scraper in lowered position;

Fig. 4 is a fragmentary view taken along the line 4—4 of Fig. 1;

Fig. 5 is a fragmentary view taken along the line 5—5 of Fig. 1;

Fig. 6 is a fragmentary side view of a preferred form of scraper lowering means; and Fig. 7 is a fragmentary perspective view of a preferred form of push bar supporting means.

Referring again to the drawings, there is shown a filter tank 1 having a filter bed 2 located adjacent the lower part thereof. The filter bed 2 may be of sand or other suitable material placed in desired thickness over a supporting screen 5 and grid 7. While any suitable thickness of filter bed material may be utilized, it has been found that a thickness of from three to six inches gives good results in actual operation. Dirty liquid or influent enters the tank 1 at a point located above the filter bed 2 and passes through the bed into a lower compartment 8. Passage through the bed 2 removes solid matter from the influent.

From the compartment 8 the liquid passes through suitable discharge passages (not shown) to the next treatment step, if such is desirable or necessary. Since the path of the influent through the filter bed is downwardly, this type of filter is commonly referred to as a downflow filter. While the present invention will be described chiefly with reference to a downflow type of filter, the principles thereof are equally applicable to filters of the upflow type in which the path of the influent is upwardly through a filter bed. Also, the present invention will be described chiefly with reference to its use with filter tanks and beds which are rectangular in shape, but it is to be understood that the principles thereof are equally applicable to filter tanks and beds which are circular in shape.

Trackways 10 located on top of the side walls of the filter tank 1 are adapted to support and guide the wheels 11 of a carriage or trolley 13 which supports the cleaner mechanism 14 and also the scraping or leveling mechanism of the present invention. The carriage 13 may be formed from suitable structural steel channel or angle irons and is adapted to travel progressively, with the cleaning and scraping mechanisms, over the filter bed during cleaning operations. That is, the entire area of a filter bed is not cleaned at one time but a portion thereof located beneath the cleaning means 14 is cleaned during movement of the cleaning device along the length of the filter bed. Those portions of the bed not being subjected to a cleaning operation remain effective to filter the influent.

Various types and modified forms of cleaning devices may be utilized and Patent No. 2,204,534 granted to Charles E. Fraser on June 11, 1940, is illustrative of one of them. The operation of this patent depends upon creating a localized reduction in the resistance or back-pressure of the filter to the passage of water therethrough, at an area where a magnetite sand filter bed is agitated by an electromagnet, and the inrush of water through this area in amounts sufficient to wash impurities from the magnetite during its agitation. The rise of wash water or effluent through the area of lessened resistance is caused by the difference in level between water in a caisson which encloses the agitating means and the water level in an outlet channel from the filter (not shown). As the caisson 14 passes slowly back and forth over the filter bed 2, a solenoid or electromagnet 16, submerged in water or other liquid, is alternately magnetized and demagnetized so that a narrow strip of magnetic sand is alternately jerked off the screen and allowed to fall back again. The operation of a centrifugal pump 17 lowers the level of water inside the caisson and effects an upward flow of liquid through the agitated strip of sand. The induced upward flow of liquid through the sand separates the grains of sand and impurities and carries the latter into the pump chamber 19, from which they are removed by the pump 17, Leakage of water into the caisson from the ends thereof is minimized by providing it with rotary sealing drums 20 having cleats 22 which penetrate a short distance into the sand of the filter bed. The drums 20 rest on the surface of the filter bed and make a rolling contact therewith as the cleaner caisson moves back and forth over the filter bed. The side walls 23 of the cleaner caisson are preferably provided with plate members 25 that form a sliding contact with the upwardly projecting flanges 26 of angle members that extend along the length of a filter bed at the sides thereof. The cleaner mechanism described immediately above is similar to that disclosed in Fraser Patent No. 2,204,534. Other types of cleaning mechanisms may be utilized, the above described cleaner being shown as illustrative of one type which has proven satisfactory with the present leveling or scraping device.

With cleaning mechanisms of the above described type it is frequently found that the sand comprising the filter bed is washed about by the action of the cleaner so that it does not fall back into a layer of substantially uniform thickness. It is therefore desirable that means be provided to insure the removal of hills and valleys from the filter bed layer to form a layer of substantially uniform thickness.

In the present instance the smoothing or leveling of a filter bed is achieved by means of a plurality of intermittently operable scrapers. The intermittently operable feature facilitates operation of a scraper at the rear of the cleaning mechanism, regardless of the direction of movement of the cleaning mechanism over the filter bed. The scraper mechanism comprises a pair of scraper carrying arms 28 pivotally mounted adjacent their mid-points on bearings 30 at opposite sides of the cleaner supporting framework 31. The scraper carrying arms 28 are preferably balanced on the bearings 30 so that they may be moved easily about the bearings in response to a scraper operating mechanism which will be hereinafter described. The undersides of the scraper carrying arms 28 may be provided with recesses 32 and stop members 34 adapted to fit over projections 35 secured to the cleaner supporting framework and thereby prevent excessive downward movement of the ends of the balanced arms 28. The spaced depending arms 37, which are located at corresponding ends of the scraper carrying arms 28, are adapted to support between them, at their lower ends, scrapers 38. Bracing members 40, connected adjacent their lower ends to the depending scraper arms 37 by a welded plate member 41 and to the balance member 28 adjacent their upper ends by bolts 43, may be provided to assist in maintaining the depending arms 37 in desired position. Vertical adjustment of the depending supporting arms 37 may be facilitated by providing each of the arms 37 with outwardly extending apertured brackets 44 and the balanced arms 28 with outwardly extending apertured brackets 46, adapted to receive bolts 47 and adjusting nuts 48. Screwing the nuts 48 together or apart an appropriate amount adjusts the heights of the vertical arms 37 and of the scrapers 38 secured thereto with respect to the surface of the filter bed 2. After being adjusted to a desired position the bolts 45 extending through the slots 39 in the balance arms may be maintained tightly in position by nuts 42 to hold the arms 37 against accidental change in vertical position. This assists adjusting the heights of the scrapers and in maintaining a filter bed layer of proper thickness.

The scrapers 38 may be mounted on plates 57 welded to the lower ends of the depending arms 37 and preferably comprise transverse walls 33 and wings or side walls 36 located at each side of the transverse wall 33. Providing the plates 57 with vertical slots 60 and the transverse scraper wall with horizontal slots 63 facilitates connection and adjustment of these parts by adjusting the bolts and nuts 51. The transverse wall 33 extends substantially entirely across the width of the filter bed and is preferably provided with a brace formed from an angle member 49 welded, bolted or otherwise secured to the back thereof. The brace 49 minimizes bending or bowing rearwardly of the transverse walls 33 during scraping or leveling operations. The side walls or wings 36 minimize spreading or spilling of sand around the ends of the scrapers. Any suitable height may be utilized for the transverse and side wall portions of the scraper 38, but it has been found that eight inches is satisfactory in actual practice. The scrapers are adapted to be selectively operated by mechanism which will be hereinafter described so that only a trailing scraper will be effective upon the filter bed 2 at any one time. That is, the only scraper effective upon a filter bed at any one time is the scraper which trails behind the cleaning mechanism so that it may smooth or level the bed after agitation by the cleaning mechanism.

The mechanism for selectively operating the scrapers 38 is preferably carried by the cleaner carriage or trolley 13. Even though the scraper carrying arms 28 are joined together through the scrapers 38, a separate mechanism is preferably utilized at each side of the carriage 13 for operating the scraper carrying arm located at the corresponding side of the carriage. Since these mechanisms are the same in construction and operation, a description of the mechanism at one side of the scraper will suffice for both. Links 50 are located adjacent each end of the carriage 13 and are secured to rods 52 pivotally mounted in spaced bearings 53. Mounting the rods 52 in spaced bearings holds the links 50 accurately in position. The lower or opposite ends of the links 50 are connected by bolts and nuts 54, with rollers 55 and push bar brackets 56. The two push bar brackets located at each side of the carriage are in turn connected by a push bar 58. By reason of the pivotal connections adjacent the upper and lower ends of the links 50 the push bars 58 may be moved longitudinally with respect to the direction of movement of the carriage 13 and the cleaner 14. The links 50 are preferably so positioned with respect to the push bar 58 that if the push bar were allowed to hang freely each of the links would lie at an acute angle to the push bar. That is, the spacing of the push bar brackets 56 and the lower ends of the links 50 on the push bar is greater than the distance between the rods 52 upon which are mounted the upper ends of the links 50. This construction facilitates movement in a vertical direction of the push bar brackets 56 and rollers 55 upon longitudinal movement of the push bar. When a link 50 is in vertical position, as illustrated at the right of the carriage 13 in Fig. 1 and in Figs. 3 and 6, the corresponding push bar bracket and roller will be located in lowermost or depressed position. When a link 50 at the right of the carriage 13 is so positioned that the corresponding roller is in lowermost position, the lower end of the link 50 and its corresponding roller at the left of the carriage 13 will have been moved outwardly or to the left; in this position the roller at the left will have been moved vertically to its uppermost position.

Longitudinal movement of a push bar to the right or to the left thus moves the rollers 55 vertically and the latter are effective to move the scraper carrying arm 28 and selectively operate the scrapers 38. Downward movement of the roller located at the right of the carriage 13 causes it to move into contact with a cam 59 located on the upper surface of the pivotally mounted scraper carrying arm 28 and to press the right side of the scraper carrying arm downwardly. Downward movement of the right side of the scraper carrying arm causes the scraper at the lower part of the depending arm 37 to move downwardly into operative position to smooth or level a filter bed during movement of the carriage and cleaner toward the left. (Fig. 1). In this position the link and roller located at the left or front end of the cleaner carriage will be in uppermost or ineffective position, i. e., out of contact with the cam at that end of the balanced arm. As the carriage and cleaner approach the end of their path of travel toward the left, the end of a push bar moves into contact with a stop or bumper 61 which may be in fixed position at the side of the filter tank. This shifts the push bar longitudinally toward the right and moves the link at the left end of the carriage into vertical position, thereby causing the push bar roller 55 to slide up over the cam 59 and to depress the left side of the balanced scraper carrying arm 28. As the links 50 at the left of the carriage assume a vertical position the links 50 at the right side of the carriage assume an acute angle with respect to the push bar 58, thus moving the corresponding roller off the cam and allowing the right side of the balanced arm 28 and the scraper at the right to move upwardly away from the surface of the filter bed 2.

The push bars 58 are preferably maintained in position by means of push bar springs 64 (Figs. 1 and 7) which have bearing portions 65 adapted to press firmly upwardly against the underside of the push bars 58 at all times. The push bar springs may be bolted to the balance arm bearings 30 and prevent the push bars and links from accidentally shifting their positions and thus allowing the rollers to move off the cams, which would prevent proper operation of the scrapers.

The amount of vertical movement of the balanced scraper arms 28 and the scrapers may be adjusted by changing the height of the cams 59; shims 62 have been shown provided beneath the cams for facilitating this adjustment.

In operation the carriage, cleaner and scraper mechanisms travel to and fro over the filter bed. In Fig. 1 these mechanisms are illustrated as moving toward the left. When the carriage and cleaner approach the left end of the tank a bumper 61 moves the push bar toward the right to lower the left end scraper and raise the right end scraper. A reversing trip and reversing switch (not shown) also become effective to cause the carriage 13 and cleaner to automatically reverse their direction of movement and move toward the right over the filter bed. When the carriage and cleaner approach the opposite end of the filter tank the push bar 58 is again pressed toward the left by a stop or bumper (not shown), the carriage and cleaner reverse their direction of movement, and the action is repeated. Movement of the carriage and cleaner from one end of a rectangular filtration tank and bed to the other end thereof is automatic and continuous as long as current is supplied to a driving motor 68; this may be controlled from a master switch at a central location. It is not necessary that the cleaner be operated at all times but only when the amount of solid matter accumulated by the filter bed renders it advisable to clean the bed.

While the scraper mechanism is particularly useful in connection with rectangular shaped filter tanks, it is also useful as applied to filter tanks of circular shape. With such tanks it is occasionally necessary to shut them down in order to repair only a part of the tank. With the present scraping device it is possible to block off and repair part of the circular tank and to cause the cleaner and scraper to travel back and forth over the other portions of the tank without shutting it down completely.

It will be seen that the present invention provides a new and improved filter bed leveling means which is automatic in operation. The scraping or leveling means travels behind the cleaning means and effectively removes hills or valleys to provide a bed of substantially uniform thickness, whereby maximum filtering efficiency is achieved. In addition to leveling out a bed of sand which is already in position on a screen and grid, the present scraping mechanism is useful for leveling off a layer of new sand that may be placed on the old bed to replenish losses which have occurred. The mechanism for alternately raising and lowering appropriate portions of the leveling or scraping means is mounted on the carriage above the cleaning means where it is exposed to view and may be readily inspected or repaired without shutting off the filter and draining the liquid therefrom. The majority of parts and members utilized in the construction may be made from ordinary structural steel. The operating means is simple in construction and readily able to withstand any rough usage to which it may be subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. A device of the class described comprising, in combination, a carriage adapted to travel back and forth over a filter bed, means carried by said carriage and movable with respect thereto for cleaning said filter bed, a member operatively connected with said carriage having filter bed scraping means attached thereto at the front of said cleaning means, and means including a plurality of links pivotally connected to said carriage at their upper ends, and located above the cleaning means adapted to engage said member with their lower ends to selectively raise and lower said filter bed scraping means.

2. A device of the class described comprising, in combination, a carriage adapted to travel back and forth over a filter bed, means carried by said carriage for cleaning the filter bed, a pivotally mounted member movable with said carriage and extending beyond the front and rear of the cleaning means, filter bed leveling means rigidly attached to said member on opposite sides of the pivot and at the front and rear of the cleaning means, and mechanism for oscillating said pivotally mounted member comprising a frame and means including a plurality of links pivotally mounted at their upper ends to the carriage for mounting said frame on said carriage to permit said frame to move longitudinally with respect to said carriage and to tilt with respect to said carriage into engagement with said member to move one of said leveling means toward the operative position and the other of said leveling means away from operative position.

3. A device of the class described comprising, in combination, a carriage adapted to travel on a rigid runway back and forth over a filter bed, means carried by said carriage for cleaning the filter bed, an elongated member pivotally mounted on the carriage and extending beyond the front and rear of the cleaning means, scraping and leveling means secured on said elongated member at the front and rear of said cleaning means to level the bed, means, including a swinging frame, pivotally mounted on the carriage movable into engagement with said elongated member to move said elongated member about its pivot to raise the scraping and leveling means in the front and simultaneously to lower the scraping means in the rear, and means for moving said frame into engagement with said elongated member to effect said raising and lowering as the carriage approaches the end of its movement in one direction.

4. A device of the class described comprising, in combination, a carriage adapted to travel back and forth over a filter bed, means carried by said carriage for cleaning the filter bed, a pivotally mounted member movable with said carriage, and extending beyond the front and rear of the cleaning means, filter bed leveling means rigidly attached to said member on opposite sides of the pivot and at the front and rear of the cleaning means, and mechanism for oscillating said pivotally mounted member comprising a frame and means for mounting said frame on said carriage in operative relation with respect to said pivoted member to permit said frame to move longitudinally with respect to said carriage upon engagement with a stop element and to tilt with respect to said carriage into engagement with said member to move one of said leveling means toward operative position and the other of said leveling means away from operative position.

5. A device of the class described comprising, in combination, a carriage adapted to travel over a filter bed, means carried by said carriage for cleaning said filter bed, a member pivotally mounted on said carriage having filter bed scraping means attached thereto at the front and rear of the cleaning means and means including a plurality of arms pivotally connected at one end to said carriage and with their other ends movable into engagement with said member to selectively raise the filter bed scraping means at one end of said member and simultaneously lower the scraping means at the other end.

6. A device of the class described comprising, in combination, a carriage adapted to travel over a filter bed, means carried by said carriage for cleaning said filter bed, a member pivotally connected with said carriage with ends extending longitudinally thereof, filter bed scraping means operatively attached to the respective ends of said member, a plurality of links pivotally connected at one end with said carriage, a member for joining said links together, means carried by said links at their other ends to engage said pivotal member when said links are moved about their pivots, to tilt said pivoted member, and means for moving said joining member to move said links about their pivots to tilt said pivoted member and selectively raise the filter bed scraping means at one end and simultaneously lower the filter bed scraping means at the other end.

7. A filter bed scraper comprising, in combination, a carriage adapted to travel over a filter bed, links pivotally connected at one end with said carriage adjacent the front and rear ends of the carriage, a member pivotally connected to said links adjacent the free ends thereof, said links being at an angle with respect to each other to cause said member to tilt when the links swing about their carriage pivots, a pivotally mounted arm carried by said carriage and filter bed scraping means operatively connected to the respective ends of said arm, and means for moving said link connecting member to move said links into operative relation with respect to said arm and to move said arm about its pivot to raise the filter bed scraping means at one end of the carriage and to lower the filter bed scraping means at the other end.

8. A device of the class described comprising, in combination, a carriage adapted to travel over a filter bed, filter bed cleaning means carried by said carriage, a member extending longitudinally of the cleaner pivoted at its middle to said cleaner, a pair of scrapers extending across substantially the entire width of said filter bed, one of said scrapers being mounted at one end of said pivoted member and another being mounted at the other end thereof, and means including a second elongated member swingingly mounted on said carriage for engaging said first member and for tilting said first member about its pivot to raise one of said scrapers and to lower the other.

9. A device of the class described comprising, in combination, a carriage adapted to travel over a filter bed, filter bed cleaning means carried by said carriage, a longitudinal member pivotally mounted on said cleaning means, a pair of scrapers attached to said member and extending across substantially the entire width of said filter bed ahead of and behind the cleaning means, and means, including a plurality of links pivoted at their upper ends to said carriage for engaging said member at their other ends, for engaging and moving said member about its pivot for raising one of said scrapers out of contact with the filter bed and lowering the other into contact with the filter bed.

10. A device of the class described comprising, in combination, a carriage adapted to travel over a filter bed, filter bed cleaning means carried by said carriage, a member pivotally mounted with respect to said carriage having ends extending toward the front and rear of the carriage, scraper supporting arms adjustably secured to the respective ends of said member and having scrapers adjacent the lower ends thereof, and means including an elongated member and a plurality of pivoted links, pivotally connected to the carriage at their upper ends and attached to said elongated member at their lower ends, for engaging said pivotally mounted member and for engaging and moving said pivotally mounted member about its pivot to raise one scraper out of contact with the filter bed and to lower the other into contact with the filter bed.

11. In a device of the class described, the combination of a carriage adapted to travel over a filter bed, filter bed cleaning means carried by said carriage, a pair of members pivoted at their middle to said carriage, scraping means secured to the ends of said members, a plurality of links pivotally connected at one end to said carriage to engage and actuate said pivoted members with their other ends, means for retaining said links at an angle to each other and for moving said links about their pivots to engage and move said pivoted members about their pivots, to raise one scraper out of contact with the filter bed and to lower the other into contact with the filter bed and means for releasably locking said links in position to retain one of said scrapers in effective position.

12. In a device of the class described, the combination of a carriage adapted to travel over a filter bed, a filter bed cleaning means carried by said carriage, a pair of members pivoted at their middle to said carriage and movable with said carriage and cleaning means, said members being adapted to tilt into alternate positions about said pivot, scraping means secured to the respective ends of said members, cam surfaces operatively connected with said members, links pivotally connected to said carriage, means for retaining said links at an angle to each other and moving said links about their pivots and means operatively connected to said links for engaging said cam surfaces to tilt said pivoted members about their pivots into alternate tilted positions and means to hold said pivoted members in said alternate tilted positions whereby one scraper is held in raised position and the other in lowered position.

13. In a device of the class described, the combination of a carriage adapted to move over a filter bed, a filter bed cleaner carried by said carriage, a frame pivotally mounted at its middle on said carriage and having scraping means at its ends, a swinging frame pivotally suspended from the carriage for engaging said first frame and tilting it about its pivot means for swinging said swinging frame to engage and tilt said first frame, and means for locking said first frame in tilted position.

ABRAHAM B. ASCH.